US010236735B2

(12) United States Patent
Kudose et al.

(10) Patent No.: US 10,236,735 B2
(45) Date of Patent: Mar. 19, 2019

(54) ELECTRIC CONDUCTOR FOR COIL AND ROTATING ELECTRIC MACHINE

(71) Applicant: DENSO CORPORATION, Kariya, Aichi-pref. (JP)

(72) Inventors: Yuichi Kudose, Kariya (JP); Takefumi Kaji, Kariya (JP)

(73) Assignee: DENSO CORPORATION, Kariya (JP)

( * ) Notice: Subject to any disclaimer, the term of this patent is extended or adjusted under 35 U.S.C. 154(b) by 330 days.

(21) Appl. No.: 15/290,719

(22) Filed: Oct. 11, 2016

(65) Prior Publication Data

US 2017/0104377 A1 Apr. 13, 2017

(30) Foreign Application Priority Data

Oct. 9, 2015 (JP) .................................. 2015-200935

(51) Int. Cl.
| | |
|---|---|
| H02K 3/30 | (2006.01) |
| H02K 3/12 | (2006.01) |
| H02K 1/16 | (2006.01) |
| H02K 1/27 | (2006.01) |
| H02K 3/32 | (2006.01) |
| H02K 3/34 | (2006.01) |
| H02K 3/48 | (2006.01) |

(52) U.S. Cl.
CPC ................. *H02K 3/12* (2013.01); *H02K 1/16* (2013.01); *H02K 1/2706* (2013.01); *H02K 3/32* (2013.01); *H02K 3/34* (2013.01); *H02K 3/48* (2013.01)

(58) Field of Classification Search
CPC ...................................................... H02K 3/30

USPC .................................. 310/179–184, 195–208
See application file for complete search history.

(56) References Cited

U.S. PATENT DOCUMENTS

| | | | | |
|---|---|---|---|---|
| 7,948,143 | B2* | 5/2011 | Nakamura ......... | H02K 15/0037 310/201 |
| 8,256,259 | B2* | 9/2012 | Takada ...................... | B21F 1/00 29/596 |
| 9,647,502 | B2* | 5/2017 | Takahashi ................ | H02K 3/12 |
| 2015/0364977 | A1* | 12/2015 | Hattori ...................... | H02K 3/38 310/208 |
| 2016/0006309 | A1* | 1/2016 | Wang .................. | H02K 15/0478 310/208 |
| 2017/0294249 | A1* | 10/2017 | Oya .......................... | H01F 5/06 |

FOREIGN PATENT DOCUMENTS

JP 5242897 B2 7/2013

* cited by examiner

*Primary Examiner* — Jeremy A Luks
(74) *Attorney, Agent, or Firm* — Oliff PLC

(57) ABSTRACT

An electric conductor is provided for forming a coil upon being bent. The electric conductor includes a pair of electric conductor wires and an insulating coat. The electric conductor wires each have a substantially rectangular cross section and are arranged in alignment with each other in an alignment direction. The alignment direction is perpendicular to corresponding sides of the substantially rectangular cross sections of the electric conductor wires; the corresponding sides have the same length. The insulating coat is formed on outer peripheral surfaces of the electric conductor wires. The insulating coat has a thick portion formed at a boundary between the electric conductor wires. The thick portion is thicker than and protrudes outward from other portions of the insulating coat which adjoin the thick portion in a circumferential direction of the electric conductor.

6 Claims, 11 Drawing Sheets

ELECTRIC CONDUCTOR FOR COIL AND ROTATING ELECTRIC MACHINE

CROSS-REFERENCE TO RELATED APPLICATION

This application is based on and claims priority from Japanese Patent Application No. 2015-200935 filed on Oct. 9, 2015, the content of which is hereby incorporated by reference in its entirety into this application.

BACKGROUND

1. Technical Field

The present invention relates to an electric conductor that includes a plurality of electric conductor wires and an insulating coat formed on outer peripheral surfaces of the electric conductor wires, and to a rotating electric machine that includes a coil formed of the electric conductor.

2. Description of Related Art

Japanese Patent No. 5242897B2 discloses a rotating electric machine for a vehicle. The rotating electric machine includes a stator coil formed of an electric conductor. The electric conductor includes a pair of electric conductor wires (or sub-electric conductors) and an insulating coat. The electric conductor wires each have a rectangular cross section and are arranged in alignment with each other in an alignment direction; the alignment direction is perpendicular to the shorter sides of the rectangular cross-sections of the electric conductor wires. The insulating coat is formed on outer peripheral surfaces of the electric conductor wires. Moreover, the insulating coat is also formed between the electric conductor wires. The electric conductor is bent into a predetermined shape and received in slots of a stator core of the rotating electric machine.

In bending the electric conductor, the electric conductor wires constituting the electric conductor are bent at different radii of curvature. Consequently, the electric conductor wires are displaced in different directions to become separated in the vicinities of bent parts of the electric conductor wires. As a result, the size of the stator coil formed of the electric conductor is increased in the vicinities of the bent parts, thereby increasing the size of the entire rotating electric machine.

SUMMARY

According to exemplary embodiments, there is provided an electric conductor for forming a coil upon being bent. The electric conductor includes a pair of electric conductor wires and an insulating coat. The electric conductor wires each have a substantially rectangular cross section and are arranged in alignment with each other in an alignment direction. The alignment direction is perpendicular to corresponding sides of the substantially rectangular cross sections of the electric conductor wires; the corresponding sides have the same length. The insulating coat is faulted on outer peripheral surfaces of the electric conductor wires. The insulating coat has a thick portion formed at a boundary between the electric conductor wires. The thick portion is thicker than and protrudes outward from other portions of the insulating coat which adjoin the thick portion in a circumferential direction of the electric conductor.

Consequently, with the thick portion, it is possible to enhance the strength of the insulating coat at the boundary between the electric conductor wires. As a result, when the electric conductor is bent to form the coil, it is possible to suppress the electric conductor wires from being separated from each other.

It is preferable that the thick portion of the insulating coat is formed along a direction of longitudinal axes of the electric conductor wires at least over a part of the electric conductor which is to be bent to form a bent part of the coil.

It is also preferable that the thick portion of the insulating coat has a thickness set so that after the electric conductor is bent to form the coil, the thickness is reduced to a predetermined thickness required for electrical insulation of the coil.

It is also preferable that each of the electric conductor wires has its corners of the substantially rectangular cross section chamfered.

According to the exemplary embodiments, there is also provided a rotating electric machine which includes a coil formed of the above electric conductor.

In a further implementation, the rotating electric machine may further include a stator core that has a plurality of slots, in which the coil formed of the electric conductor is received, and a rotor that generates magnetic flux. Each of the substantially rectangular cross sections of the electric conductor wires constituting the electric conductor has a pair of longer sides and a pair of shorter sides. The alignment direction of the electric conductor wires is perpendicular to either the longer sides or the shorter sides of the substantially rectangular cross sections of the electric conductor wires. The coil formed of the electric conductor may be preferably received in the slots of the stator core so that the alignment direction of the electric conductor wires constituting the electric conductor crosses at least one of the magnetic flux from the rotor and magnetic flux from the stator core.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Exemplary embodiments will be described hereinafter with reference to FIGS. 1-12. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

Figure 1:
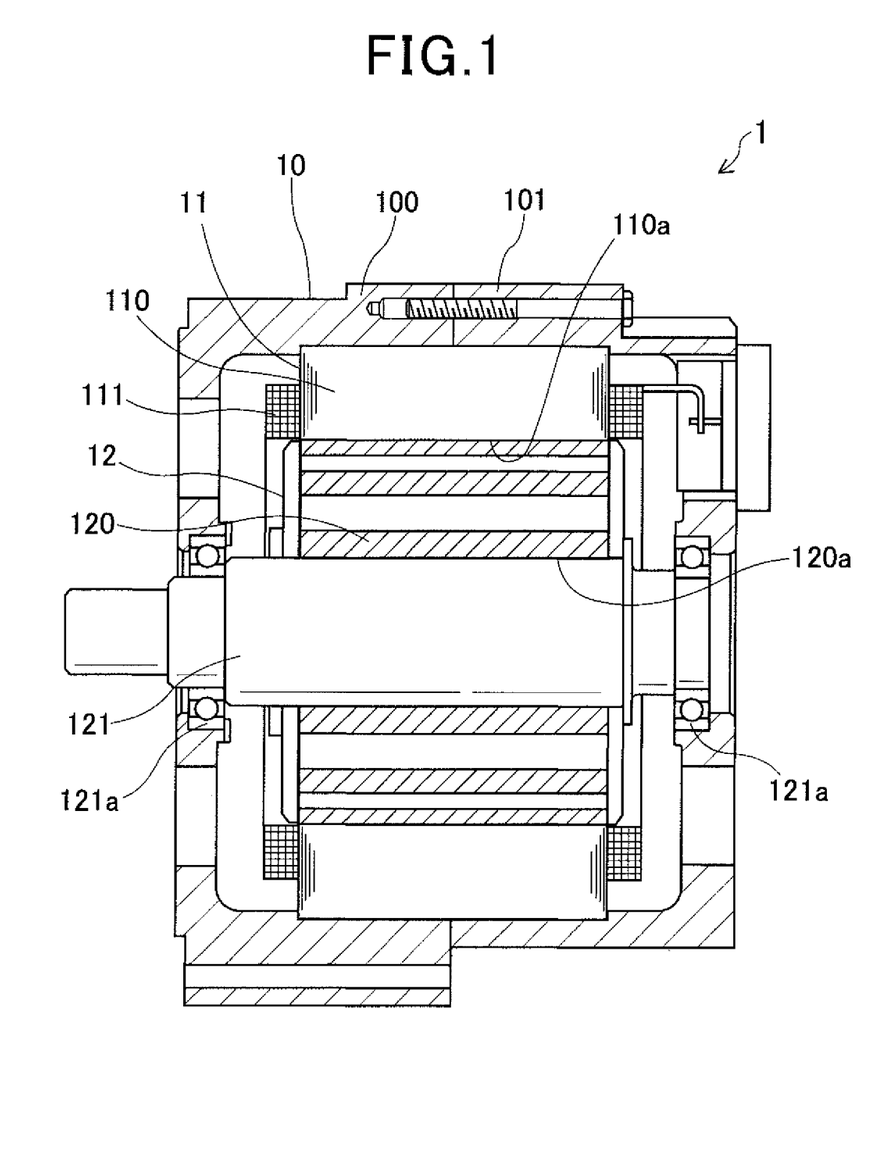
FIG. 1 is a partially cross-sectional view, taken along an axial direction, of a rotating electric machine according to a first embodiment.

FIG. 1 shows the overall configuration of a rotating electric machine 1 according to a first embodiment.

In the present embodiment, the rotating electric machine 1 is configured as a motor-generator for use in a motor vehicle. Specifically, upon being supplied with electric power from a battery (not shown) of the vehicle, the rotating electric machine 1 functions as an electric motor to generate torque (or driving force) for driving the motor vehicle. Otherwise, upon being supplied with torque from an engine (not shown) of the vehicle, the rotating electric machine 1 functions as an electric generator to generate electric power for charging the battery.

As shown in FIG. 1, the rotating electric machine 1 includes a housing 10, a stator 11 and a rotor 12.

The housing 10 receives both the stator 11 and the rotor 12 therein and rotatably supports the rotor 12. The housing 10 is comprised of a pair of cup-shaped housing pieces 100 and 101 which are jointed together at the open ends thereof.

The stator 11 is fixed in the housing 10 so as to surround the radially outer periphery of the rotor 12. The stator 11 constitutes part of a magnetic circuit formed in the rotating electric machine 1. When supplied with electric current, the stator 11 generates magnetic flux. Otherwise, when magnetic flux through the stator 11 is generated by the rotor 12, the stator 11 generates alternating current.

Figure 4:
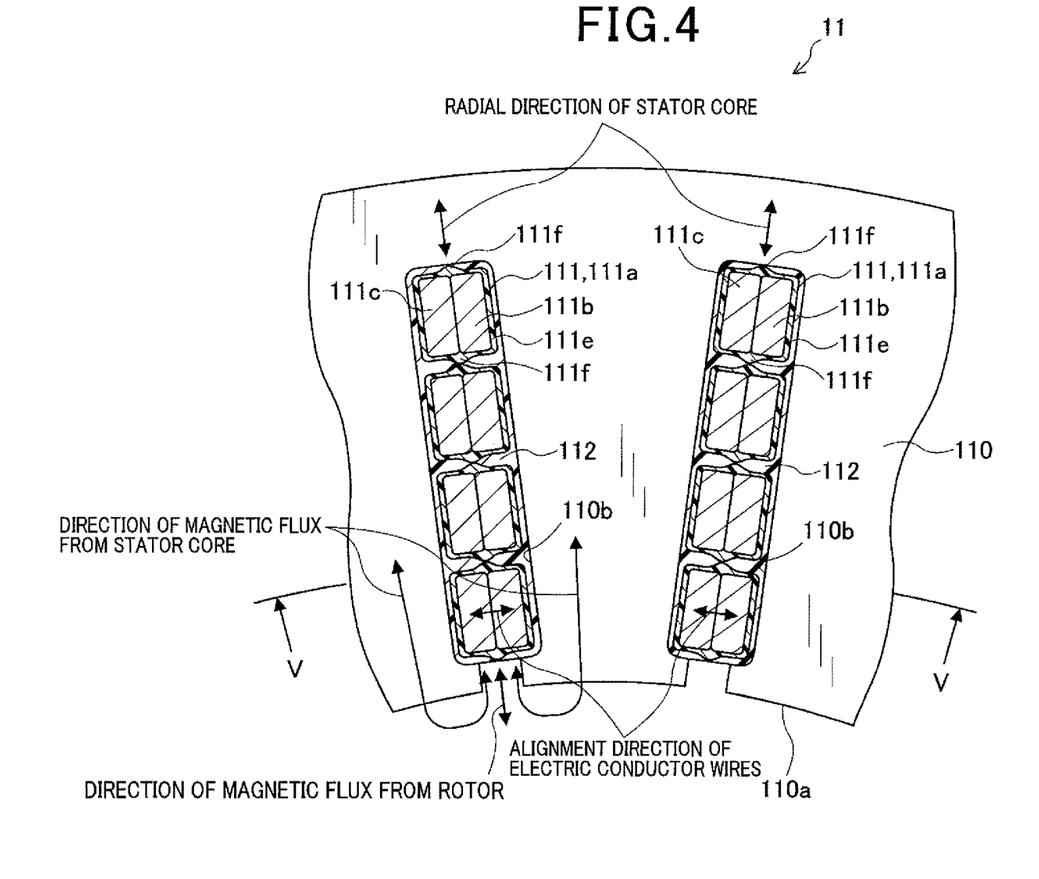
FIG. 4 is a partially cross-sectional view, taken perpendicular to the axial direction, of part of a stator of the rotating electric machine, the stator including the stator coil formed of the electric conductor and a stator core having slots in which the stator coil is received.

As shown in FIGS. 1 and 4, the stator 11 includes a hollow cylindrical (or annular) stator core 110, a stator coil 111 mounted on the stator core 110, and varnish 112 provided to electrically insulate the stator coil 111 from the stator core 110.

The stator core 110 is fixed to the inner circumferential surfaces of the housing pieces 100 and 101. The stator core 110 is made of a magnetic material and constitutes part of the magnetic circuit formed in the rotating electric machine 1. The stator core 110 holds the stator coil 111. At a radially central part of the stator core 110, there is formed a circular through-hole 110a so as to axially penetrate the stator core 110. Moreover, in the stator core 110, there are formed a plurality of slots 110b that each axially penetrate the stator core 110 and are circumferentially spaced from one another at equal intervals. Each of the slots 110b has a substantially rectangular cross section perpendicular to the axial direction of the stator core 110.

Figure 2:
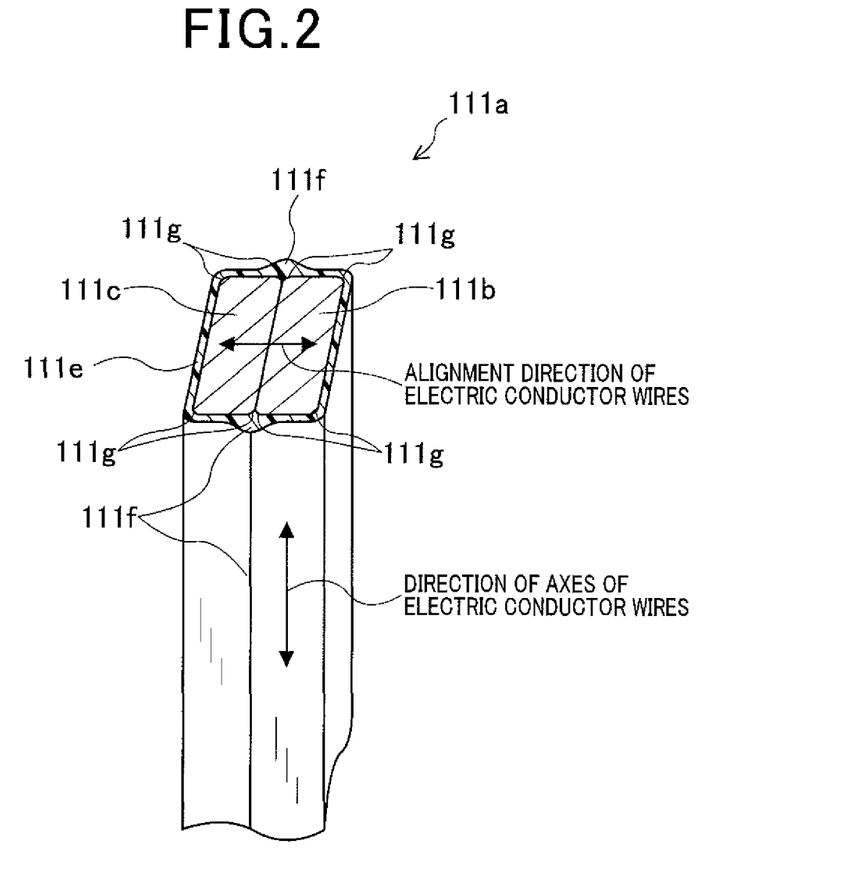
FIG. 2 is a perspective view, partially in cross section, of part of an electric conductor according to the first embodiment, the electric conductor being used to form a stator coil of the rotating electric machine.
Figure 3:
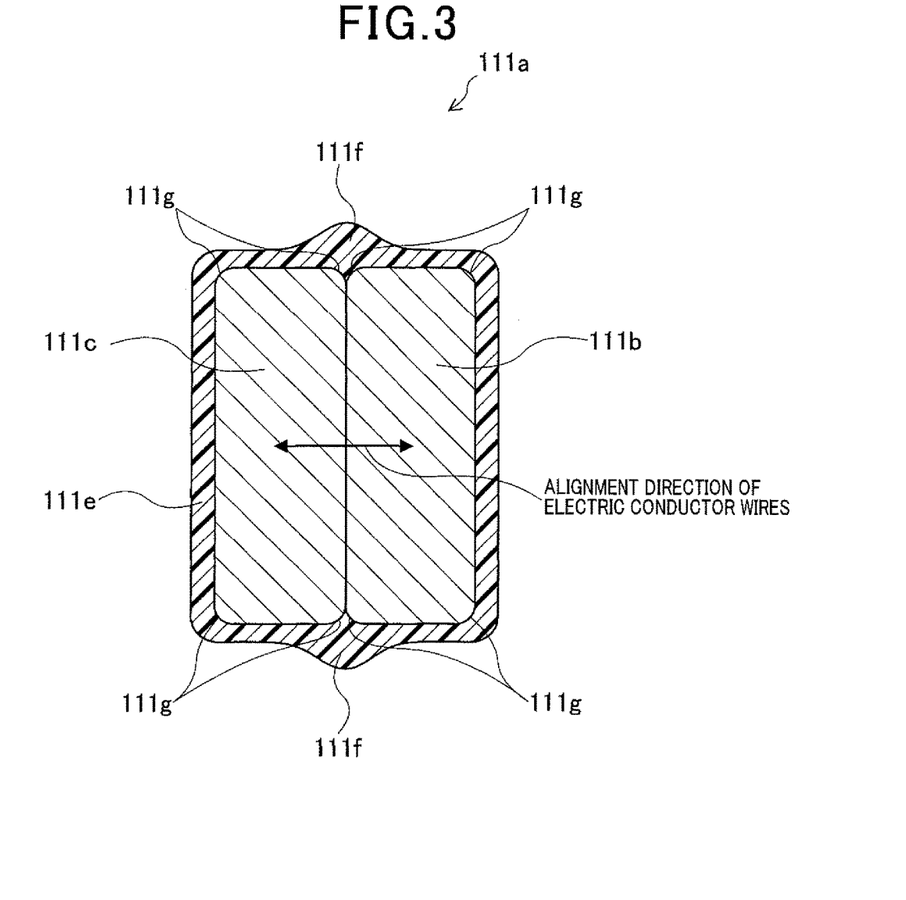
FIG. 3 is a cross-sectional view of the electric conductor.

The stator coil 111 generates magnetic flux when supplied with electric current. Otherwise, the stator coil 111 generates alternating current when magnetic flux generated by the rotor 12 passes through the stator coil 111. The stator coil 111 is formed by bending an electric conductor 111a as shown in FIGS. 2 and 3 into a wave shape.

The electric conductor 111a includes a pair of electric conductor wires 111b and 111c and an insulating coat 111e.

Each of the electric conductor wires 111b and 111c is made, for example, of copper and has a substantially rectangular cross section. It should be noted that hereinafter, the term "rectangular" encompasses "square".

Moreover, each of the electric conductor wires 111b and 111c has its corners 111g of the substantially rectangular cross section chamfered. More particularly, in the present embodiment, each of the electric conductor wires 111b and 111c has its corners 111g of the substantially rectangular cross section round-chamfered (or rounded).

The electric conductor wires 111b and 111c are arranged in abutment with each other and in alignment with each other in an alignment direction; the alignment direction is perpendicular to the longer sides of the substantially rectangular cross-sections of the electric conductor wires 111b and 111c.

The insulating coat 111e is formed, for example, of an electrically insulative resin to cover outer peripheral surfaces of the electric conductor wires 111b and 111c.

In the present embodiment, the insulating coat 111e has a pair of thick portions 111f if formed at a boundary between the electric conductor wires 111b and 111c so as to be located respectively on opposite sides of the boundary. Each of the thick portions 111f is thicker than and protrudes outward (or in a direction away from the electric conductor wires 111b and 111c) from other portions of the insulating coat 111e which adjoin the thick portion 111f if in a circumferential direction of the electric conductor 111a.

More particularly, in the present embodiment, each of the thick portions 111f of the insulating coat 111e is formed along the direction of longitudinal axes (or the longitudinal direction) of the electric conductor wires 111b and 111c continuously over the entire length of the electric conductor 111a.

Moreover, the thickness of the thick portions 111f of the insulating coat 111e is set so that after the thickness is reduced during the bending of the electric conductor 111a to form the stator coil 111, the thickness becomes equal to a predetermined thickness required for electrical insulation of the stator coil 111.

Figure 5:
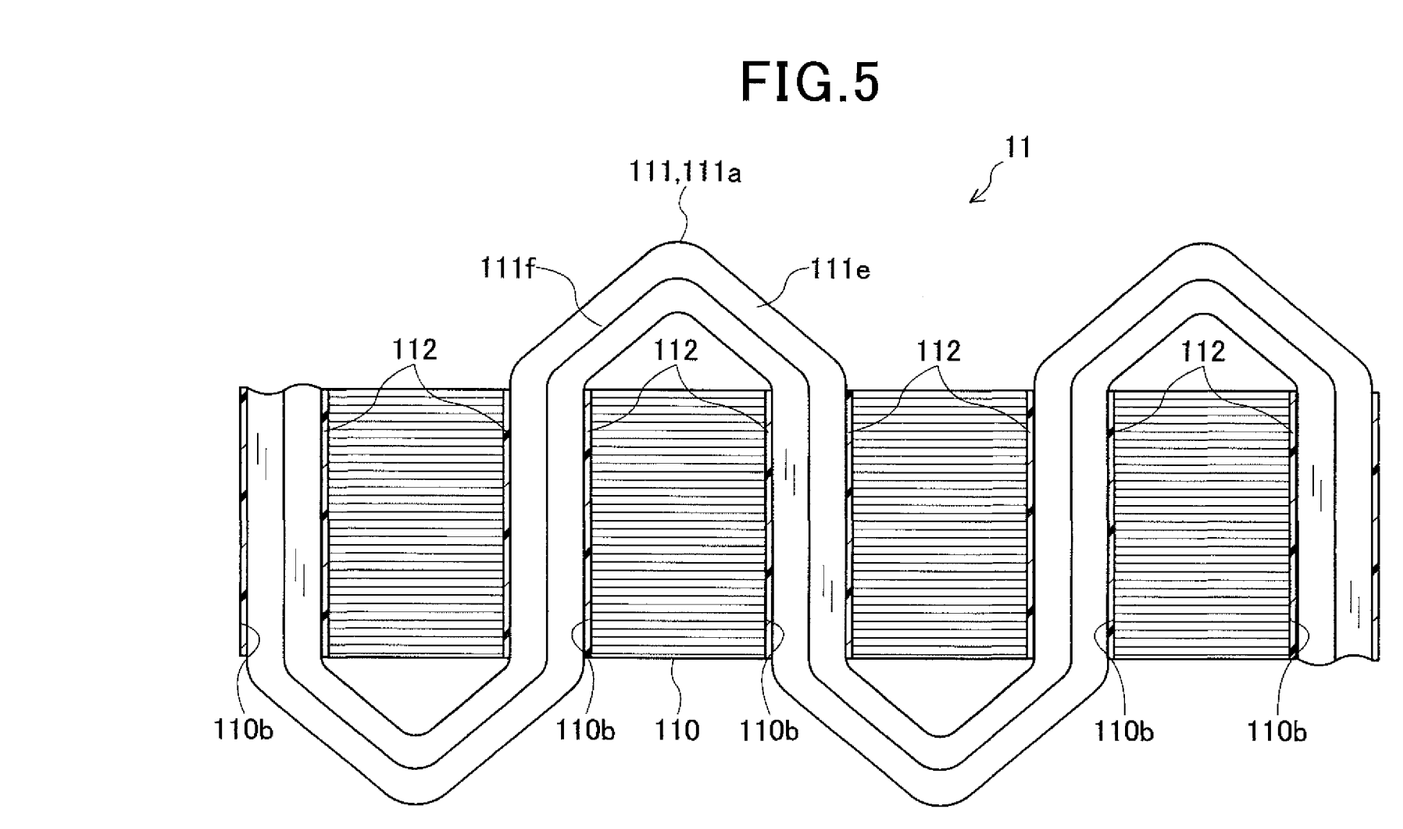
FIG. 5 is a cross-sectional view taken along the line V-V in FIG. 4.

The electric conductor 111a is bent into the wave shape as shown in FIG. 5. Moreover, as shown in FIG. 4, the electric conductor 111a is received in the slots 110b of the stator core 110 so that the alignment direction of the electric conductor wires 111b and 111c constituting the electric conductor 111a crosses magnetic fluxes passing through the electric conductor wires 111b and 111c. In other words, the electric conductor 111a is received in the slots 110b of the stator core 110 so that the alignment direction of the electric conductor wires 111b and 111c crosses a radial direction of the stator core 110.

Figure 6:
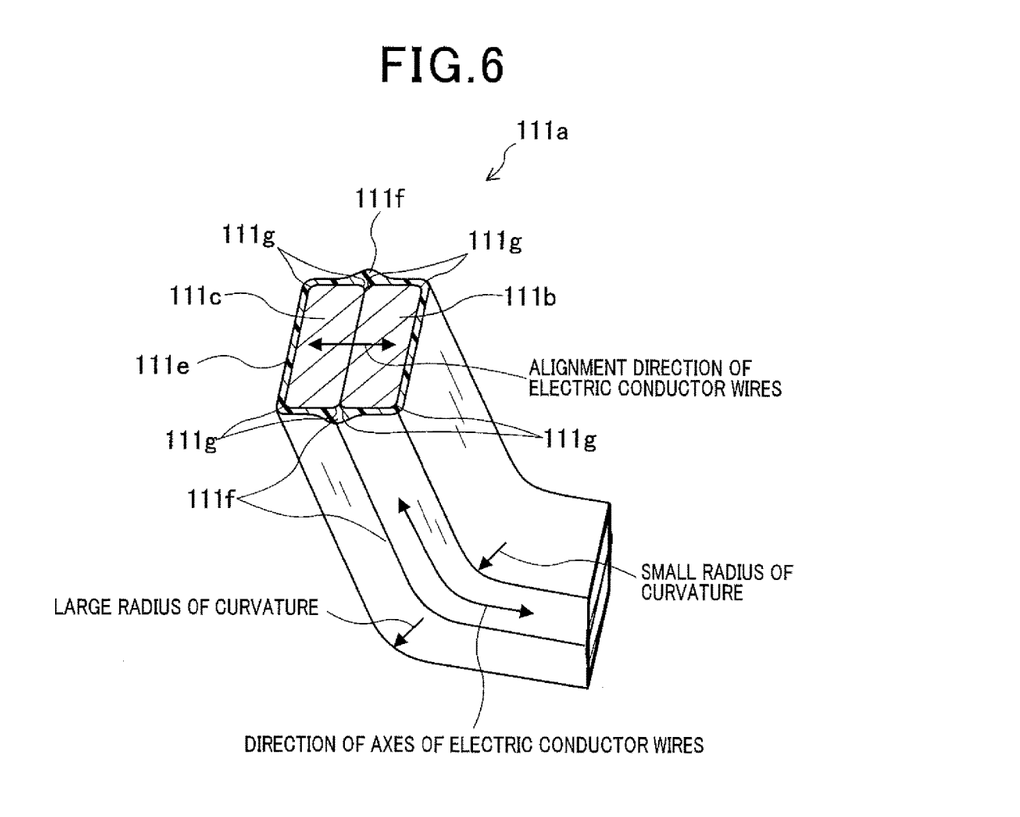
FIG. 6 is a schematic view illustrating the electric conductor according to the first embodiment in a bent state.

Furthermore, in the present embodiment, as shown in FIG. 6, the electric conductor 111a is bent in the alignment direction of the electric conductor wires 111b and 111c constituting the electric conductor 111a. In the bending of the electric conductor 111a, the electric conductor wire 111b located on the inner side of the bending and the electric conductor wire 111c located on the outer side of the bending are bent at different radii of curvature. Consequently, the electric conductor wires 111b and 111c are displaced respectively to opposite sides in the alignment direction thereof and thus apt to be separated in the vicinities of bent parts of the electric conductor wires 111b and 111c. However, in the present embodiment, the insulating coat 111e has the thick portions 111f formed at the boundary between the electric conductor wires 111b and 111c. Consequently, with the thick portions 111f, it is possible to enhance the strength of the insulating coat 111e at the boundary between the electric conductor wires 111b and 111c. As a result, when the electric conductor 111a is bent to form the stator coil 111, it is possible to suppress the electric conductor wires 111b and 111c from being separated from each other.

As shown in FIGS. 4 and 5, the varnish 112 is applied in the slots 110b of the stator core 110 to fix in-slot portions of the electric conductor 111a to each other as well as to fix the electric conductor 111a to the stator core 110. The varnish 112 is formed, for example, of an electrically insulative resin. The varnish 112 is filled in the slots 110b of the stator core 110 from one axial side of the stator core 110. Then, by being heated, the varnish 112 becomes able to bond the in-slot portions of the electric conductor 111a to each other as well as to bond the electric conductor 111a to the stator core 110.

Referring back to FIG. 1, the rotor 12 constitutes part of the magnetic circuit formed in the rotating electric machine 1. When magnetic flux through the rotor 12 is generated by the stator 11, the rotor 12 generates torque. Otherwise, when rotated by torque supplied by the engine of the vehicle, the rotor 12 generates magnetic flux passing through the stator coil 111, thereby inducing alternating current in the stator coil 111. The rotor 12 includes a hollow cylindrical (or annular) rotor core 120 and a rotating shaft 121.

The rotor core 120 is made of a magnetic material and constitutes part of the magnetic circuit formed in the rotating electric machine 1. At a radially central part of the rotor core 120, there is formed a circular through-hole 120a so as to axially penetrate the rotor core 120. Moreover, on a radially outer periphery of the rotor core 120, there are arranged magnets to form a plurality of magnetic poles. The rotor core 120 is located in the through-hole 110a of the stator core 110, so that the magnets arranged on the radially outer periphery of the rotor core 120 face the radially inner surface of the stator core 110 through a predetermined air gap formed therebetween.

The rotating shaft 121 is made of a metal and has a substantially cylindrical shape. The rotating shaft 121 is fixedly fitted in the through-hole 120a of the rotor core 120 and rotatably supported by the housing 10 via a pair of bearings 121a. Consequently, the rotating shaft 121 can rotate together with the rotor core 120.

Next, operation of the rotating electric machine 1 according to the present embodiment will be described.

As mentioned previously, in the present embodiment, the rotating electric machine 1 is configured as a motor-generator that selectively operates in either a motor mode or a generator mode.

In the motor mode, electric power is supplied from the battery of the motor vehicle to the stator coil 111. Consequently, electric current flows in the stator coil 111, generating magnetic flux. The generated magnetic flux passes through the rotor 12, causing the rotor 12 to rotate and generate torque for driving the motor vehicle.

In the generator mode, the rotor 12 is rotated by torque supplied from the engine of the motor vehicle, generating magnetic flux. The generated magnetic flux passes through the stator coil 111, inducing alternating current in the stator coil 111. The alternating current is then rectified into direct current, and the obtained direct current is used to charge the battery of the motor vehicle.

According to the present embodiment, it is possible to achieve the following advantageous effects.

In the present embodiment, the stator coil 111 is formed by bending the electric conductor 111a into the wave shape. The electric conductor 111a includes the pair of electric conductor wires 111b and 111c and the insulating coat 111e. The electric conductor wires 111b and 111c each have the substantially rectangular cross section and are arranged in alignment with each other in the alignment direction; the alignment direction is perpendicular to the longer sides of the substantially rectangular cross sections of the electric conductor wires 111b and 111c. The insulating coat 111e is formed on the outer peripheral surfaces of the electric conductor wires 111b and 111c. The insulating coat 111e has the pair of thick portions 111f formed at the boundary between the electric conductor wires 111b and 111c so as to be located respectively on opposite sides of the boundary. Each of the thick portions 111f is thicker than and protrudes outward from the other portions of the insulating coat 111e which adjoin the thick portion 111f in the circumferential direction of the electric conductor 111a.

Consequently, with the thick portions 111f, it is possible to enhance the strength of the insulating coat 111e at the boundary between the electric conductor wires 111b and 111c. As a result, when the electric conductor 111a is bent to form the stator coil 111, it is possible to suppress the electric conductor wires 111b and 111c from being separated from each other.

In the present embodiment, each of the thick portions 111f of the insulating coat 111e is formed along the direction of longitudinal axes of the electric conductor wires 111b and 111c continuously over the entire length of the electric conductor 111a.

With the above formation, it is possible to reliably provide the thick portions 111f in the bent parts of the stator coil 111 (or the electric conductor 111a). Consequently, though the electric conductor 111a is bent to form the stator coil 111, it is still possible to reliably suppress the electric conductor wires 111b and 111c from being separated from each other.

In the present embodiment, the thickness of the thick portions 111f of the insulating coat 111e is set so that after the thickness is reduced during the bending of the electric conductor 111a to form the stator coil 111, the thickness becomes equal to the predetermined thickness required for electrical insulation of the stator coil 111.

Setting the thickness of the thick portions 111f as above, it is possible to reliably ensure electrical insulation of the stator coil 111.

In the present embodiment, each of the electric conductor wires 111b and 111c has its corners 111g of the substantially rectangular cross section chamfered, and more particularly round-chamfered.

Consequently, compared to the case of the corners 111g being not chamfered, it is possible to apply an increased amount of the electrically insulative resin for forming the insulating coat 111e between the electric conductor wires 111b and 111c. Thus, it is possible to increase the thickness of the thick portions 111f of the insulating coat 111e formed at the boundary between the electric conductor wires 111b and 111c, thereby enhancing the strength of the insulating coat 111e at the boundary. As a result, when the electric conductor 111a is bent to form the stator coil 111, it is possible to reliably suppress the electric conductor wires 111b and 111c from being separated from each other.

In the present embodiment, the rotating electric machine 1 includes the stator coil 111 that is formed by bending the electric conductor 111a into the wave shape. As described above, in the electric conductor 111a, the insulating coat 111e has the thick portions 111f formed at the boundary between the electric conductor wires 111b and 111c. Therefore, it is possible to suppress the electric conductor wires 111b and 111c from being separated from each other at coil ends of the stator coil 111; the coil ends of the stator coil 111 protrude respectively from opposite axial end faces of the stator core 110. Consequently, it is possible to suppress increase in the size of the coil ends of the stator coil 111, thereby minimizing the size of the entire rotating electric machine 1.

When magnetic flux from the rotor 12 and magnetic flux from the stator core 110 pass through the electric conductor wires 111b and 111c, eddy current is induced in the electric conductor wires 111b and 111c. Here, the magnetic flux from the stator core 110 denotes magnetic flux which is generated when electric current is supplied to the stator coil 111.

Figure 7:
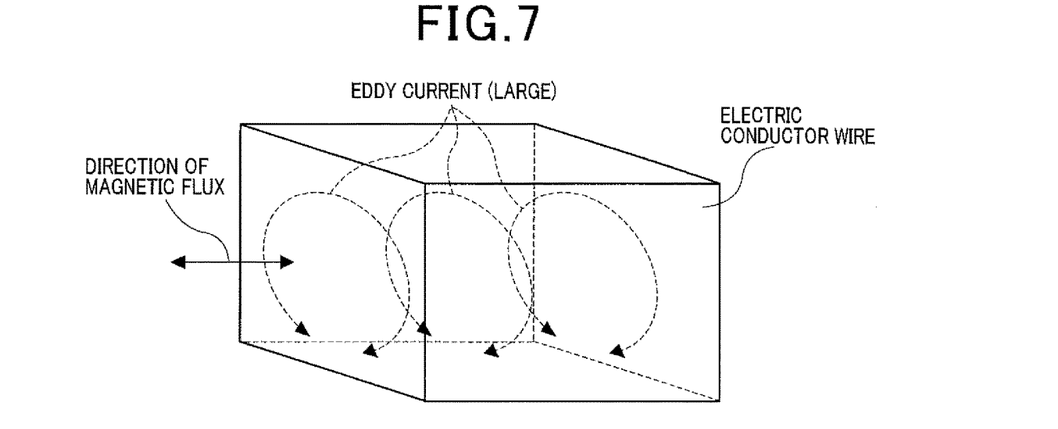
FIG. 7 is a schematic view illustrating eddy current induced in an electric conductor according to a comparative example, the electric conductor according to the comparative example being constituted of a single electric conductor wire.

As shown in FIG. 7, in a comparative example where an electric conductor is constituted of a single electric conductor wire, the flow path of eddy current is wide. Consequently, the eddy current induced in the electric conductor and thus the eddy current loss of the electric conductor is large.

Figure 8:
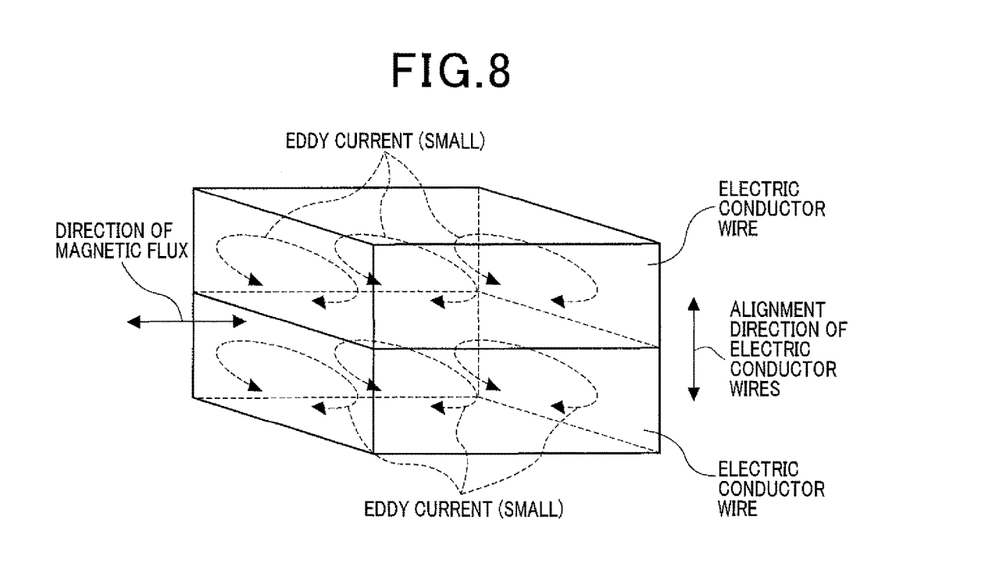
FIG. 8 is a schematic view illustrating eddy current induced in the electric conductor according to the first embodiment, the electric conductor according to the first embodiment being constituted of a pair of electric conductor wires.

In comparison, in the present embodiment, the electric conductor 111a is constituted of the electric conductor wires 111b and 111c that are arranged in alignment with each other in the alignment direction; the alignment direction is perpendicular to the longer sides of the substantially rectangular cross sections of the electric conductor wires 111b and 111c. Moreover, the electric conductor 111a is received in the slots 110b of the stator core 110 so that the alignment direction of the electric conductor wires 111b and 111c crosses the magnetic fluxes from the rotor 12 and the stator core 110 (see FIG. 4). Consequently, as shown in FIG. 8, the flow path of eddy current in the electric conductor 111a is segmented, thereby reducing the eddy current induced in the electric conductor 111a by the magnetic fluxes from the rotor 12 and the stator core 110 and thus the eddy current loss of the electric conductor 111a.

Second Embodiment

Figure 9:
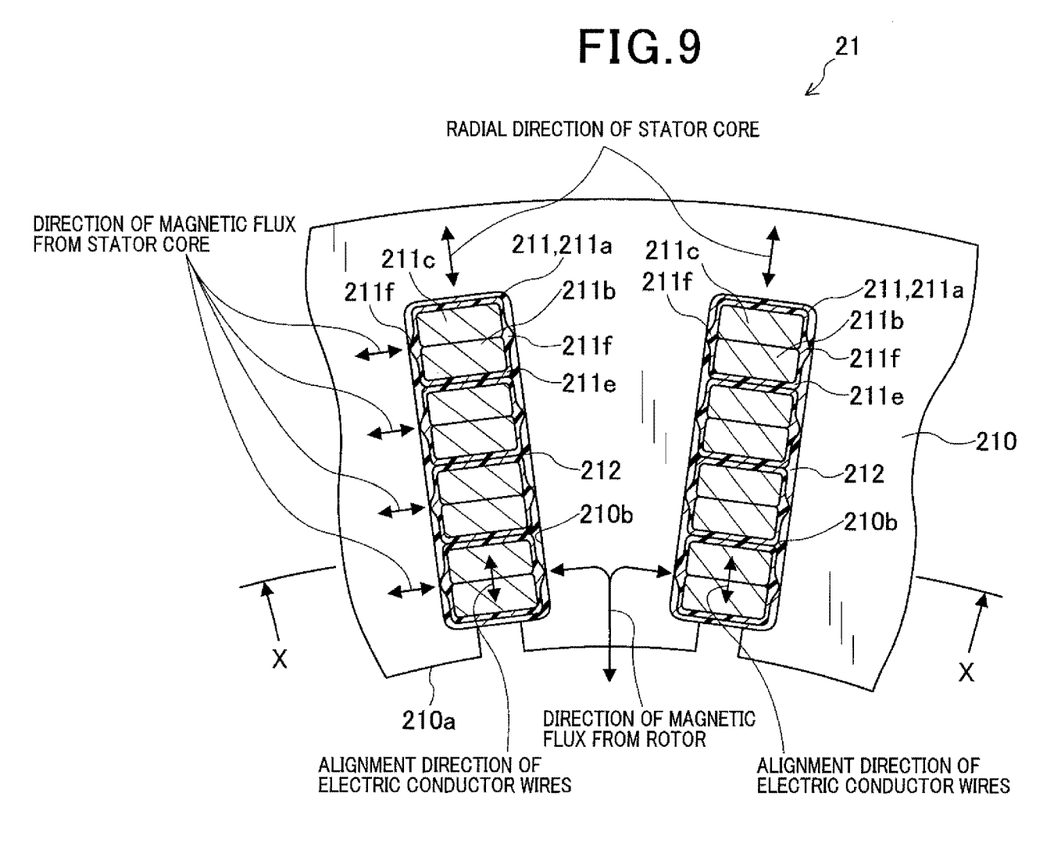
FIG. 9 is a partially cross-sectional view, taken perpendicular to the axial direction, of part of a stator that includes a stator coil formed of an electric conductor according to a second embodiment.
Figure 10:
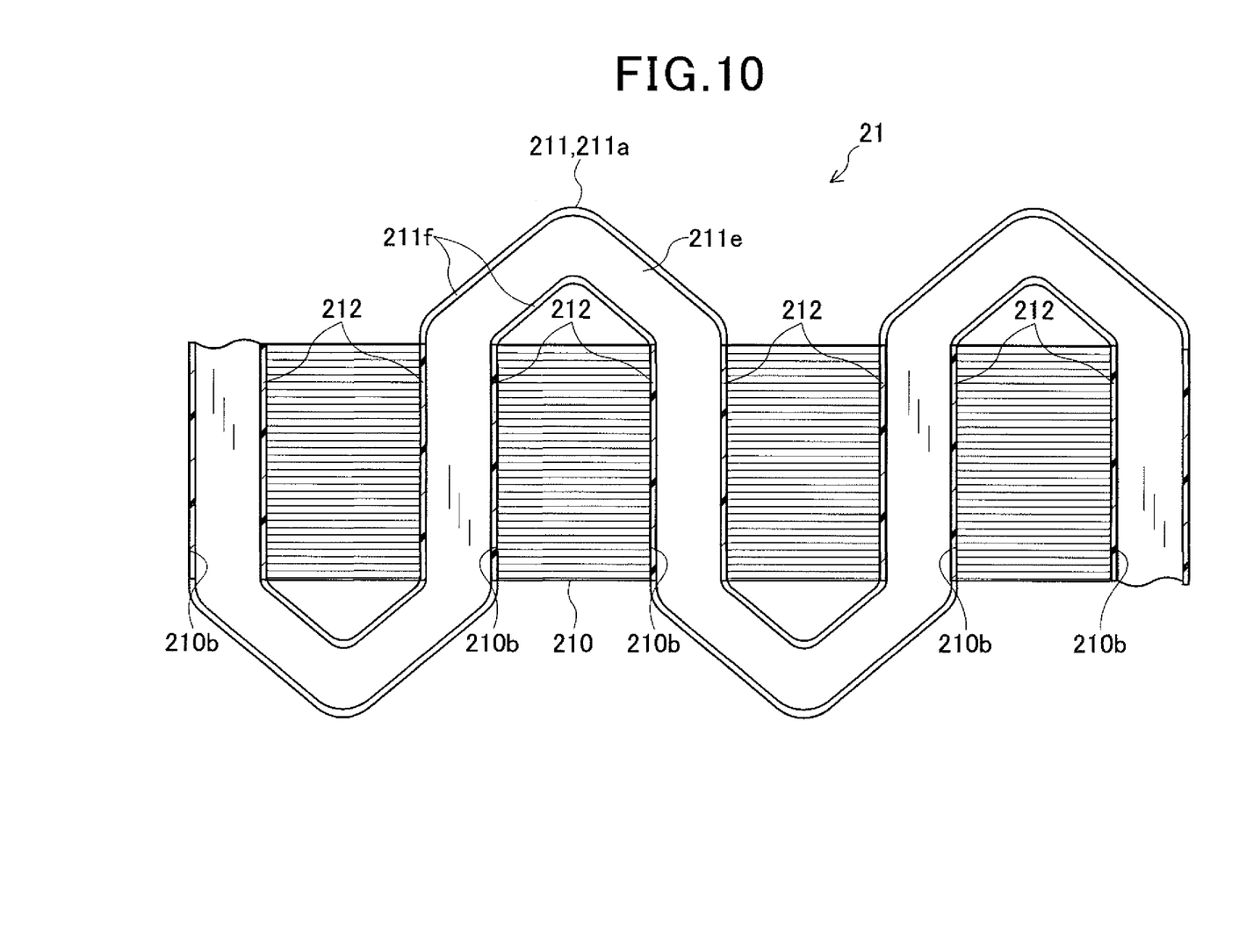
FIG. 10 is a cross-sectional view taken along the line X-X in FIG. 9.
Figure 11:
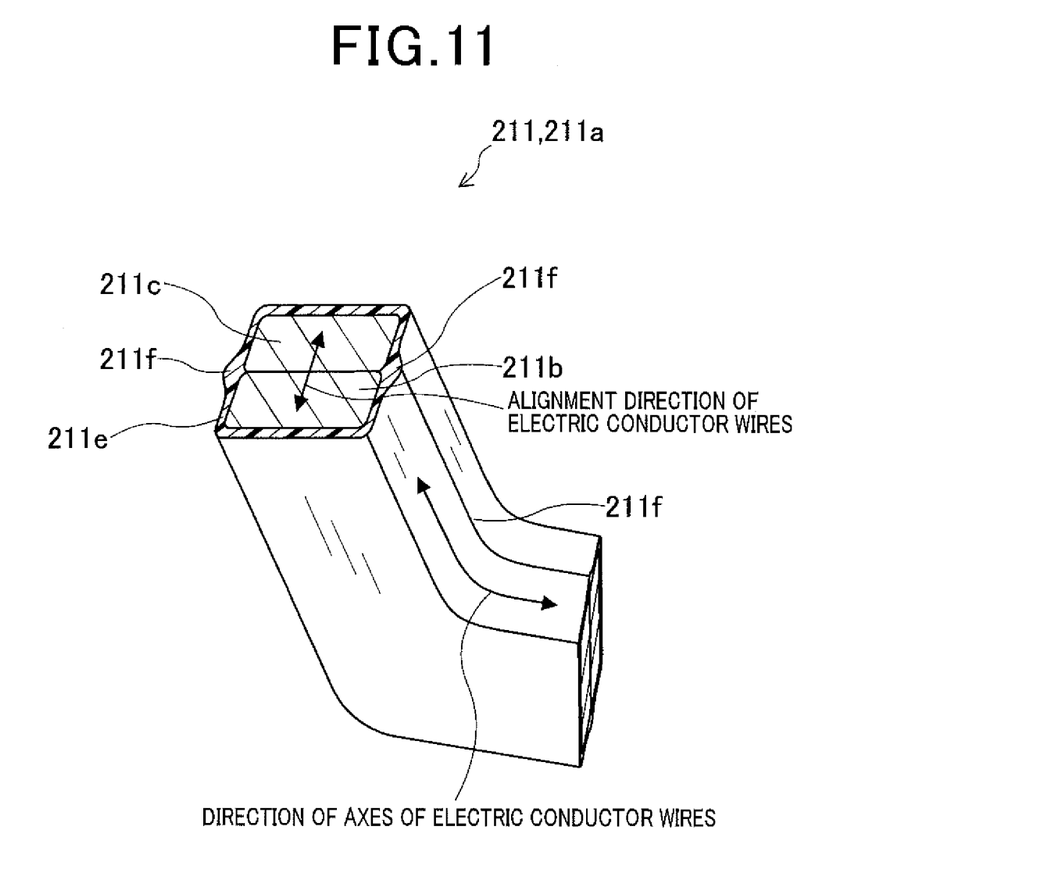
FIG. 11 is a schematic view illustrating the electric conductor according to the second embodiment in a bent state.

As shown in FIGS. 9-11, an electric conductor 211a according to a second embodiment has the same configuration as the electric conductor 111a according to the first embodiment. That is, the electric conductor 211a according to the present embodiment includes a pair of electric conductor wires 211b and 211c and an insulating coat 211e. The electric conductor wires 211b and 211c each have a substantially rectangular cross section and are arranged in alignment with each other in an alignment direction; the alignment direction is perpendicular to the longer sides of the substantially rectangular cross-sections of the electric conductor wires 211b and 211c. The insulating coat 211e is formed on outer peripheral surfaces of the electric conductor wires 211b and 211c. The insulating coat 211e has a pair of thick portions 211f formed at a boundary between the electric conductor wires 211b and 211c so as to be located respectively on opposite sides of the boundary. Each of the thick portions 211f is thicker than and protrudes outward from other portions of the insulating coat 211e which adjoin the thick portion 211f in a circumferential direction of the electric conductor 211a.

As shown in FIG. 10, the electric conductor 211a is bent into a wave shape to form a stator coil 211. Moreover, as shown in FIG. 9, the stator coil 211 formed of the electric conductor 211a is received in slots 210b of a stator core 210 so that the alignment direction of the electric conductor wires 211b and 211c constituting the electric conductor 211a crosses magnetic flux from the rotor 12 (not shown) and magnetic flux from the stator core 210. In other words, the electric conductor 211a is received in the slots 210b of the stator core 210 so that the alignment direction of the electric conductor wires 211b and 211c is parallel to a radial direction of the stator core 210, not crossing a radial direction of the stator core as in the first embodiment.

Moreover, in the present embodiment, as shown in FIG. 11, the electric conductor 211a is bent in a direction perpendicular to the alignment direction of the electric conductor wires 211b and 211c constituting the electric conductor 211a, not in the alignment direction as in the first embodiment. Furthermore, in the present embodiment, as shown in FIG. 9, the electric conductor wire 211b is located closer to a central axis (not shown) of the stator core 210 than the electric conductor wire 211c is. Therefore, in the bending of the electric conductor 211a, the electric conductor wire 211b located closer to the central axis of the stator core 210 and the electric conductor wire 211c located further from the central axis of the stator core 210 are bent at different radii of curvature. Consequently, the electric conductor wires 211b and 211c are displaced respectively to opposite sides in the direction perpendicular to the alignment direction thereof and thus apt to be separated in the vicinities of bent parts of the electric conductor wires 211b and 211c. However, in the present embodiment, the insulating coat 211e has the thick portions 211f formed at the boundary between the electric conductor wires 211b and 211c. Consequently, with the thick portions 211f, it is possible to enhance the strength of the insulating coat 211e at the boundary between the electric conductor wires 211b and 211c. As a result, when the electric conductor 211a is bent to form the stator coil 211, it is possible to suppress the electric conductor wires 211b and 211c from being separated from each other.

As described above, the electric conductor 211a according to the present embodiment has the same configuration as the electric conductor 111a according to the first embodiment. Therefore, though the electric conductor 211a is bent in the direction perpendicular to the alignment direction of the electric conductor wires 211b and 211c, not in the alignment direction as in the first embodiment, it is still possible to achieve the same advantageous effects as described in the first embodiment.

For example, in the present embodiment, when magnetic flux from the rotor 12 and magnetic flux from the stator core 210 pass through the electric conductor wires 211b and 211c, eddy current is induced in the electric conductor wires 211b and 211c. Here, the magnetic flux from the stator core 210 denotes magnetic flux which is generated when electric current is supplied to the stator coil 211. As shown in FIG. 7, in the comparative example where the electric conductor is constituted of a single electric conductor wire, the flow path of eddy current is wide. Consequently, the eddy current induced in the electric conductor and thus the eddy current loss of the electric conductor is large. In comparison, in the present embodiment, the electric conductor 211a is constituted of the electric conductor wires 211b and 211c that are arranged in alignment with each other in the alignment direction; the alignment direction is perpendicular to the longer sides of the substantially rectangular cross sections of the electric conductor wires 211b and 211c. Moreover, the electric conductor 211a is received in the slots 210b of the stator core 210 so that the alignment direction of the electric conductor wires 211b and 211c crosses the magnetic fluxes from the rotor 12 and the stator core 210 (see FIG. 9). Consequently, as shown in FIG. 8, the flow path of eddy current in the electric conductor 211a is segmented, thereby reducing the eddy current induced in the electric conductor 211a by the magnetic fluxes from the rotor 12 and the stator core 210 and thus the eddy current loss of the electric conductor 211a.

In addition, in the present embodiment, as shown in FIG. 9, the electric conductor 211a is received in the slots 210b of the stator core 210 so that each of the thick portions 211f of the insulating coat 211e circumferentially faces and abuts one of inner side surfaces of the stator core 210 which define the slots 210b. Consequently, it becomes possible to secure, between the electric conductor 211a and the inner side surfaces of the stator core 210, spaces into which varnish 212 is filled. As a result, with the varnish 212, it becomes possible to reliably bond the electric conductor 211a to the stator core 210 while securing sufficient electrical insulation between the electric conductor 211a and the stator core 210. Moreover, with the varnish 212, it also becomes possible to suppress magnetic noise of the stator core 210.

While the above particular embodiments have been shown and described, it will be understood by those skilled in the art that various modifications, changes, and improvements may be made without departing from the spirit of the present invention.

For example, in the above-described embodiments, the electric conductor includes a pair of electric conductor wires. However, an electric conductor according to the present invention may include three or more electric conductor wires.

Figure 12:
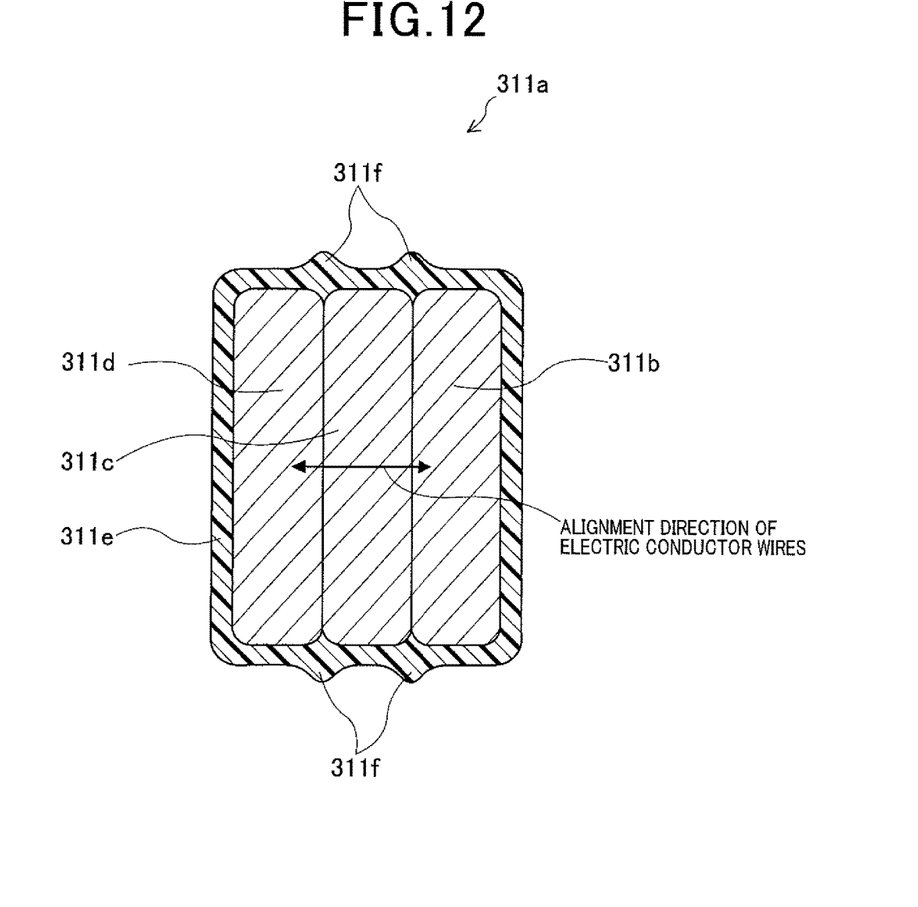
FIG. 12 is a cross-sectional view of an electric conductor according to a modification.

FIG. 12 illustrates an example where an electric conductor 311a includes three electric conductor wires 311b, 311c and 311d and an insulating coat 311e. The electric conductor wires 311b-311d each have a substantially rectangular cross section and are arranged in alignment with each other in an alignment direction; the alignment direction is perpendicular to the longer sides of the substantially rectangular cross sections of the electric conductor wires 311b-311d. The insulating coat 311e is formed on outer peripheral surfaces of the electric conductor wires 311b-311d and has two pairs of thick portions 311f. The first pair of thick portions 311f is formed at a boundary between the electric conductor wires 311b and 311c, while the second pair of thick portions 311f is formed at a boundary between the electric conductor wires 311c and 311d. Each of the thick portions 311f is thicker than and protrudes outward from other portions of the insulating coat 311e which adjoin the thick portion 311f in a circumferential direction of the electric conductor 311a.

In the above-described embodiments, each of the thick portions of the insulating coat is formed along the direction of longitudinal axes of the electric conductor wires continuously over the entire length of the electric conductor. However, each of the thick portions of the insulating coat may be formed along the direction of longitudinal axes of the electric conductor wires only over those parts of the electric conductor which are bent to form the bent parts of the stator coil.

In the above-described embodiments, the stator coil is formed of the electric conductor that is bent into the wave shape. However, the stator coil may be formed of a plurality of electric conductors that are each bent into a substantially U-shape and joined by welding to one another at their ends.

In the above-described embodiments, the electric conductor wires constituting the electric conductor are arranged in alignment with each other in the alignment direction that is perpendicular to the longer sides of the substantially rectangular cross-sections of the electric conductor wires. However, the electric conductor wires may also be arranged in alignment with each other in an alignment direction that is perpendicular to the shorter sides of the substantially rectangular cross-sections of the electric conductor wires. In either case, to suppress the eddy current loss of the electric conductor, it is preferable for the electric conductor to be received in the slots of the stator core so that the alignment direction of the electric conductor wires crosses at least one of the magnetic flux from the rotor and the magnetic flux from the stator core.

In the above-described embodiments, the present invention is applied to the rotating electric machine 1 which is configured as a motor-generator for use in a motor vehicle. However, the present invention can also be applied to other rotating electric machines, such as an electric motor or an electric generator.

What is claimed is:

1. An electric conductor for forming a coil upon being bent, the electric conductor comprising:
 a pair of electric conductor wires each having a substantially rectangular cross section and being arranged in alignment with each other in an alignment direction, the alignment direction being perpendicular to corresponding sides of the substantially rectangular cross sections of the electric conductor wires, the corresponding sides having the same length; and
 an insulating coat formed on outer peripheral surfaces of the electric conductor wires,
 wherein
 the insulating coat has a thick portion formed at a boundary between the electric conductor wires, the thick portion being thicker than and protruding outward from other portions of the insulating coat which adjoin the thick portion in a circumferential direction of the electric conductor.

2. The electric conductor as set forth in claim 1, wherein the thick portion of the insulating coat is formed along a direction of longitudinal axes of the electric conductor wires at least over a part of the electric conductor which is to be bent to form a bent part of the coil.

3. The electric conductor as set forth in claim 1, wherein the thick portion of the insulating coat has a thickness set so that after the electric conductor is bent to form the coil, the thickness is reduced to a predetermined thickness required for electrical insulation of the coil.

4. The electric conductor as set forth in claim 1, wherein each of the electric conductor wires has its corners of the substantially rectangular cross section chamfered.

5. A rotating electric machine comprising a coil formed of the electric conductor as set forth in claim 1.

6. The rotating electric machine as set forth in claim 5, further comprising:
 a stator core that has a plurality of slots in which the coil formed of the electric conductor is received; and
 a rotor that generates magnetic flux,
 wherein
 each of the substantially rectangular cross sections of the electric conductor wires constituting the electric conductor has a pair of longer sides and a pair of shorter sides, the alignment direction of the electric conductor wires is perpendicular to either the longer sides or the shorter sides of the substantially rectangular cross sections of the electric conductor wires, and the coil formed of the electric conductor is received in the slots of the stator core so that the alignment direction of the electric conductor wires constituting the electric conductor crosses at least one of the magnetic flux from the rotor and magnetic flux from the stator core.

\* \* \* \* \*